INVENTOR.
William Stelzer
BY
Harness, Dickey & Pierce
ATTORNEYS.

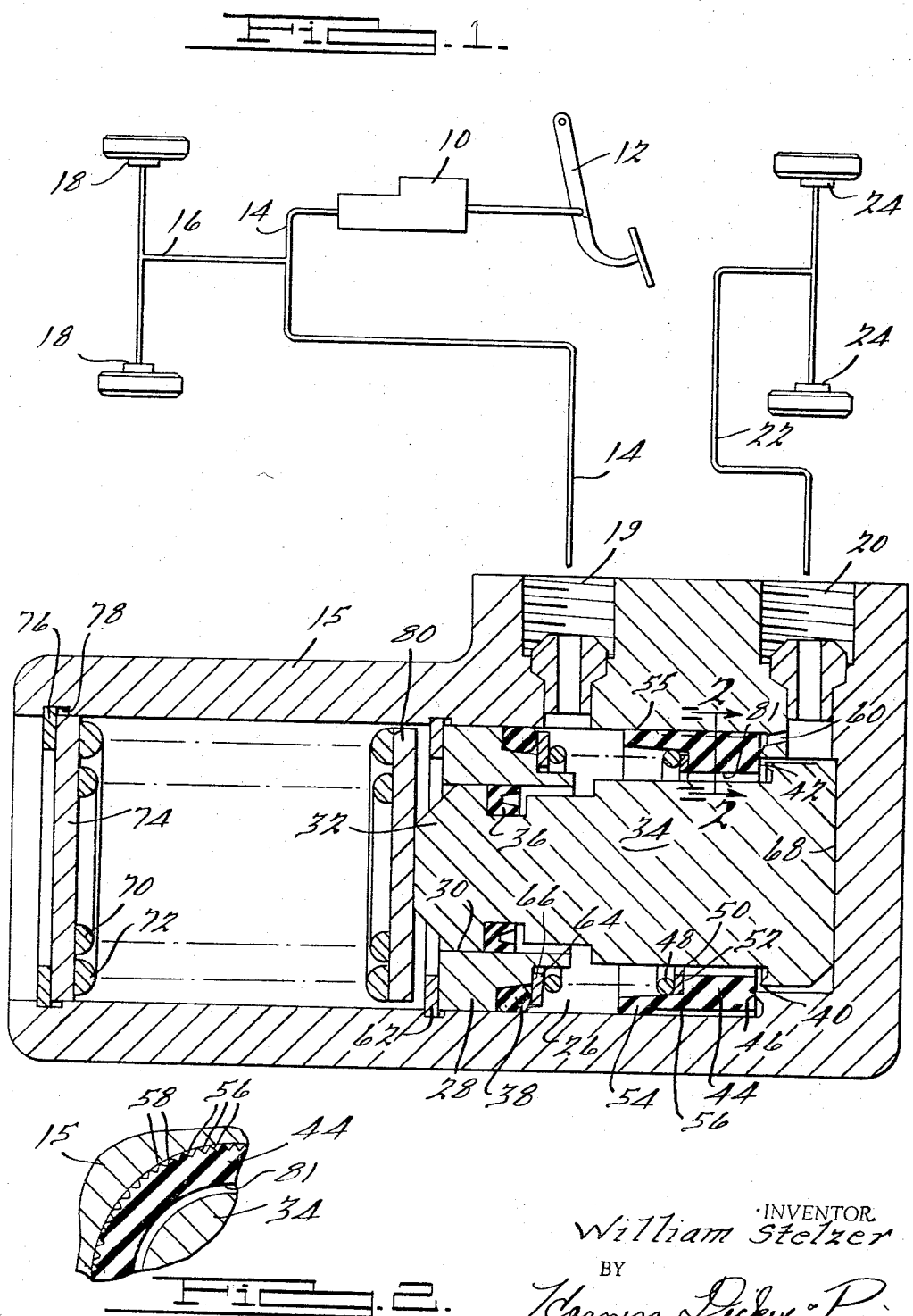

United States Patent Office 3,315,469
Patented Apr. 25, 1967

3,315,469
PRESSURE PROPORTIONING VALVE
William Stelzer, Bloomfield Hills, Mich., assignor to Kelsey-Hayes Company
Filed July 14, 1965, Ser. No. 471,920
11 Claims. (Cl. 60—54.5)

This invention relates to vehicular hydraulic brake systems and particularly to a proportioning valve operable to alter the pressurization of one brake with respect to another brake of a vehicle.

The phenomenon of vehicle weight transfer is well known to those familiar with vehicle braking systems. This involves the transfer of weight from the rear axle to the front axle of a vehicle during deceleration of the vehicle. During the deceleration of a vehicle, a couple is developed about the center mass of the vehicle which causes a portion of the weight borne by the rear wheels of the vehicle to be transferred to the vehicle's front wheels. As a result of this weight transfer, the braking effort that the rear wheels can deliver without skidding is reduced while the front wheels of the vehicle acquire an increased braking capability. The magnitude of this change is, of course, dependent upon the rate of deceleration.

In order to take advantage of the increased braking capacity of the front wheels relative to the rear wheels during rapid deceleration, various devices have been proposed to reduce the ratio of rear wheel brake pressure to front wheel brake pressure at such times. In some of these devices the pressure delivered from the master cylinder is utilized as a guide to vehicle deceleration. In other words, the deceleration is assumed to increase as master cylinder pressure increases and a reproportioning of the relative pressurization of the brake cylinders is begun at a given master cylinder pressure. The device of the present invention is of this general type.

It is an object of the present invention to produce a brake proportioning device of the above character in which the number of structural parts and seals is reduced to a minimum thereby reducing manufacturing costs and rendering the device more reliable in operation.

It is another object of the present invention to provide a proportioning device of the above character in which the ratio of rear brake pressure to front brake pressure at each level of master cylinder pressures is the same during conditions of increasing master cylinder pressure as it is during decreasing master cylinder pressure.

It is another object of the present invention to provide a proportioning device of the above character utilizing a novel resilient valve seat which functions to displace fluid to the rear brakes during conditions of increasing master cylinder pressure and which will expand to facilitate a reduction in rear wheel brake pressure upon a reduction in master cylinder pressure.

It is another object of the present invention to provide a proportioning device valve seat of the above character which will function as a check valve. These and other objects of the present invention will become apparant from the following detailed description taken in conjunction with the accompanying drawings, wherein:

FIGURE 1 is a longitudinal sectional view of a brake pressure proportioning device of the present invention shown in conjunction with a schematically illustrated brake system;

FIG. 2 is a fragmentary sectional view of the structure illustrated in FIG. 1 taken along the line 2—2 thereof.

Figure 4:
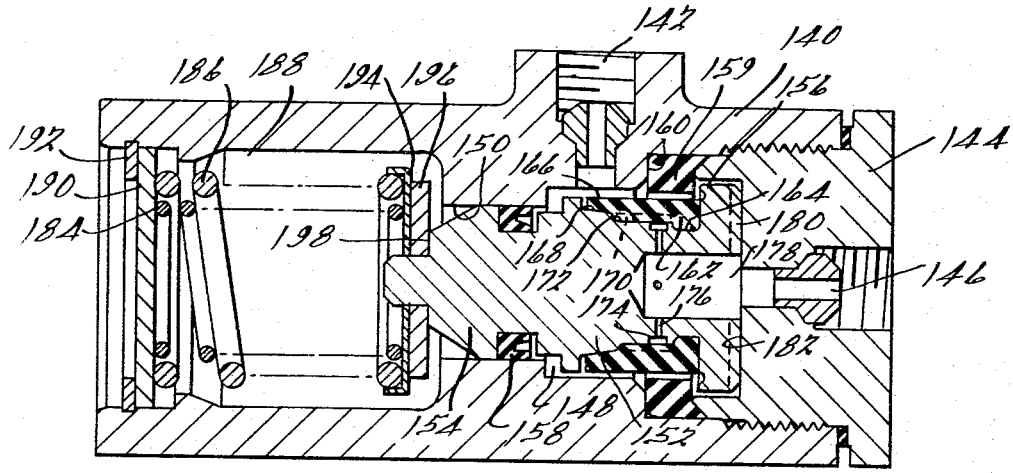
FIG. 4 is a longitudinal sectional view of another modified form of brake pressure proportioning device usable in the system illustrated in FIG. 1.

Referring now to the drawings and particularly to FIG. 1, a brake system is illustrated which includes a fluid motor or master cylinder 10 operated by a brake pedal 12 to deliver brake fluid through conduits 14 and 16 directly to a pair of front wheel brake cylinders 18 of a passenger car or other automotive vehicle. The master cylinder 10 is also operable to displace brake fluid through the conduit 14 to the proportioning device of the present invention which is incorporated within a cast metal housing 15 having an inlet opening 19 adapted to be connected to the conduit 14. The housing 15 also has an outlet opening 20 adapted to be connected to a conduit 22 leading to a pair of rear wheel brake cylinders 24. The housing 15 has a bore or chamber 26 providing communication between the inlet opening 19 and the outlet opening 20. An annular member 28 is positioned within the chamber 26 and has a bore 30 in which a piston head 32 of a body member 34 is conformably slidable. The piston head 32 carries a lip seal 36 sealingly engageable with the wall of the bore 30 to prevent the passage of fluid between the piston head 32 and the wall of the bore 30. An O-ring 38 is positioned between the member 28 and the wall of the chamber 26 to prevent the flow of fluid therebetween. The body member 34 functions as a valve element and includes an annular valve shoulder 40 extending axially of the chamber 26 from the right-hand end thereof. The valve shoulder 40 is engageable with a right-hand end wall 42 of an elastic annular valve seat 44. The seat 44 has an outside diameter conforming to the diameter of the bore or chamber 26 and sealingly engages the wall of the chamber 26. The seat 44 is held against an annular shoulder 46 of the housing 16 by means of a coil spring 48 which engages a steel washer 50 to hold the same flatly against an annular shoulder 52 of the seat member 44. The seat 44 is of a reduced thickness at that portion thereof to the left of the shoulder 52, thereby defining a lip 54 having a continuous outer peripheral surface 55 contacting the wall of the chamber 26. That portion of the outer periphery of the seat 44 to the right of the surface 55 is provided with a plurality of circumferentially or angularly spaced, axially extending grooves 56 of generally V-shaped cross section. Relatively narrow ridges or lands 58 are disposed between the grooves 56 and contact the wall of the chamber 26. The grooves 56 are open to the right hand end wall 42 of the seat 44 and are in communication with the outlet opening 20 through a plurality of ports 60 formed in the housing 15 radially outwardly of the annular shoulder 46. The seat 44, being made of neoprene or other elastomeric material, is able to expand and contract in a radial direction to displace fluid out of and admit fluid into the grooves 56. This serves a function which will be subsequently explained.

The coil spring 48 which holds the seat 44 in place also serves to hold the annular member 28 against a snap ring 62 positioned within the chamber 26. This is accomplished through an intermediary steel washer 64 engageable with an annular shoulder 66 of the annular member 28. The washer 64 also serves to hold the O-ring 38 in place.

The body member 34 is biased in a right-hand direction against an end wall 68 of the chamber 26 by means of a pair of preloaded coil springs 70 and 72. The springs 70 and 72 seat against a flat steel plate 74 at the left-hand end thereof which, in turn, abuts a snap ring 76 held in place within a groove 78 of the housing 15. The springs 70 and 72 engage a plate 80 at their right-hand ends which, in turn, engages the end of the piston head 32.

By this means, the body member 34 is constantly subjected to a predetermined force tending to move it in a right-hand direction.

During light braking of the vehicle, the proportioning device of the present invention fails to modify or change in any way the brake pressure delivered to the rear brake cylinders 24 with respect to the pressure delivered to the front brake wheel cylinders 18. At this time, fluid communication between the inlet 19 and the outlet 20 exists through the annular space immediately surrounding the body member 34, the space between the body member 34 and an inner peripheral surface 81 of the seat 44 (which is of slightly greater diameter than the adjacent outer peripheral surface of the body member 34), the space between the valve shoulder 40 and the end wall 42 of the valve seat member 44, and the passages 60.

As fluid pressure builds up within the chamber 26 it will act against the body member 34 over an area equal to the diameter of the bore 30 or piston head 32 and attempt to move the body member 34 to the left. When the force produced by the pressure acting against this area is sufficient to overcome the combined forces of the springs 70 and 72, the springs 70 and 72 will begin to yield and the body member 34 will move in a left-hand direction until the valve shoulder 40 seals against the wall 42 and embeds itself in the valve seat 44. At this point communication between the inlet opening 19 and the outlet opening 20 is closed. Thereafter, initial increases in pressure on the inlet side of the seat 44 will tend to expand the valve seat member 44 in a radially outward direction compressing the grooves 56 to displace uid out of the grooves and pressurize fluid at the outlet opening 20. It will be seen from the shape of the grooves 56 and lands 58 that they offer successively greater resistance to compression. For this reason, the pressure at the rear brake cylinders 24 does not increase at the same rate as the front brake pressure, but at a lower rate. The grooves 56 may be proportioned to take care of substantially the entire volume requirements of the rear brakes after valve closure or only a portion of this requirement. With the valve shoulder 40 closed, increases in master cylinder pressure will tend to reopen the valve by acting against the body member 34 over an effective annular area equal to the difference between the diameter of the piston head 32 and the diameter of the mean area of sealing contact of the valve shoulder 40 with the valve wall 42. If the grooves 56 can no longer collapse enough to produce a concurrent increase in outlet pressure, then master cylinder pressure combined with the force of the springs 70 and 72 will be sufficient to move body member 34 to the right against the force of outlet fluid pressure acting in an opposite direction on the body member 34 over a circular area having the diameter of the mean sealing area of the shoulder 40 and bleed small amounts of fluid pass the valve shoulder 40. This produces an increase in rear wheel brake pressure, but the amount of increase in rear wheel brake pressure will be less than the amount of increase in master cylinder or front brake pressure. This is because the rear brake pressure at the outlet 20 acts against the body member 34 over an area which is larger than the effective area of the body member against which the opposing force of inlet fluid pressure acts. Accordingly, a given increase in master cylinder pressure will be balanced by a lesser increase in rear brake pressure.

During pressurization of the rear brakes by the collapse of the grooves 56, the valve shoulder 40 will have been imbedded somewhat into the material of the seat 44. For this reason, an increase in master cylinder pressure may cause the body member 34 to move to the right to restore the proper balance between front and rear pressure without actually opening the valve. It will be noted that such movement tends to relieve front brake pressure and increase rear brake pressure.

During a decrease in master cylinder pressure the device of the present invention will maintain the same relationship between front and rear brake pressure as existed when master cylinder pressure was increasing. As master cylinder pressure is reduced the rear wheel brake pressure will tend to move the body member 34 to the left, causing the shoulder 40 to imbed more deeply into the material of the valve seat member 44. At the same time, the grooves 56 will expand to receive fluid from the outlet opening 20. Normally, the imbedment of the valve shoulder 40 into the seat 44 and the collapsing of the grooves 56 are sufficient to permit the rear brake pressure to descend at the same rate as it ascended.

When the device of the present invention is used in a brake system, the rear brake pressure can never be greater than front brake pressure or master cylinder pressure. This is because the lip 54 of the valve seat member 44 functions as a check valve. The lip 54 is held against the wall of the chamber 26 only by master cylinder pressure which is normally greater than the opposing force of rear brake pressure acting against the outer periphery of the lip 54. If rear brake pressure should become greater than front brake pressure, the lip 54 will be distorted radially inwardly to permit the direct flow of fluid from the grooves 56 into that part of the chamber 26 to the left of the valve seat member 44, thereby reducing rear brake pressure to a level equal to master cylinder pressure.

Figure 3:
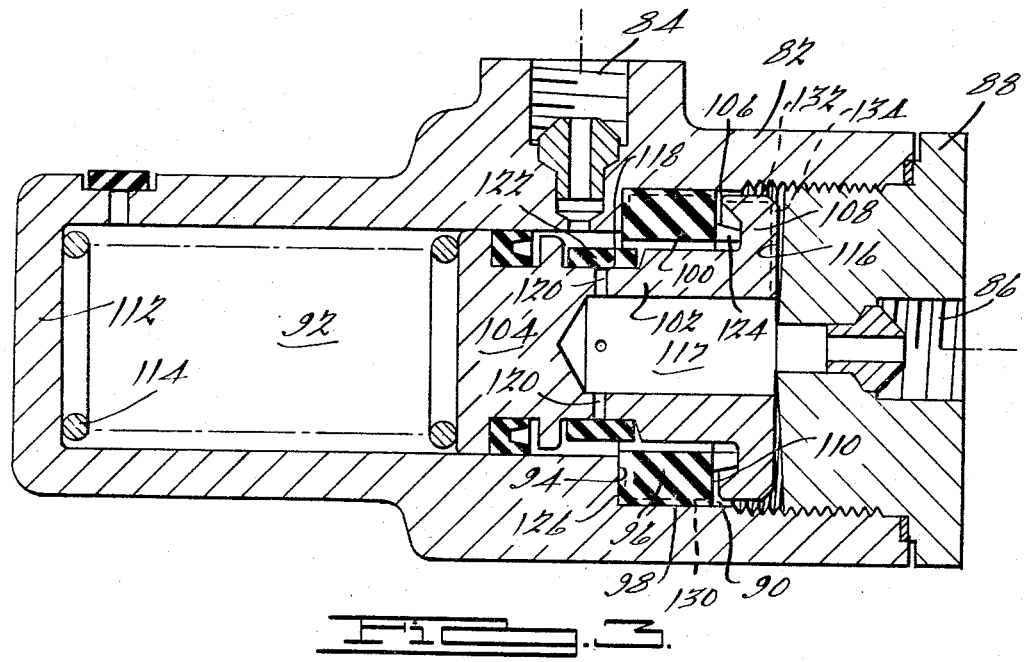
FIG. 3 is a longitudinal sectional view of a modified form of brake pressure proportioning device usable in the system illustrated in FIG. 1.

FIG. 3 illustrates another form of the present invention adapted for interposition in a brake system of the type illustrated in FIG. 1 in lieu of the structure embodied in the housing 15. The structure of FIG. 3 includes a housing 82 having an inlet opening 84 adapted to be connected to the conduit 14, while an outlet opening 86 is adapted to be connected to the conduit 22. The outlet opening 86 is formed in an end plug member 88 threaded into the right-hand end of a bore 90 formed in the housing 82. The bore 90 opens directly to a coaxial bore 92 of lesser diameter and an annular radially extending shoulder 94 is formed between the bores 90 and 92. A resilient valve seat member 96 is positioned within the bore 90 and engages the shoulder 94. The valve seat member 96 possesses an outer periphery 98 corresponding to the diameter of the bore 90 and an inner periphery 100 of a diameter slightly greater than the diameter of the adjacent portion of a body member 102 extending through the valve seat member 96. The body member 102 includes a piston head portion 104 and a valve element portion having the form of an annular valve shoulder 106 formed at the right-hand end of the body member 102. The shoulder 106 is formed on a radially outwardly extending flange 108 of the body member 102 and extends in an axially left-hand direction so as to engage an end wall 110 of the valve seat member 96.

The left-hand end of the bore 92 is closed by an end wall 112 against which a coil spring 114 is seated. The spring 114 bears against the end of the piston head portion 104 of the body member 102 to bias the body member 102 against an end wall 116 of the plug 88. The spring 114 exerts a force against the body member 102 of a predetermined magnitude.

The right-hand end of the body member 102 is provided with a bore 117 which is open to the outlet 86 and which communicates with a groove 118 formed in the outer periphery of the member 102 through a plurality of radial passages 120. An elastic sleeve 122 is positioned within the groove 118 and normally closes the passages 120; however, the sleeve 122 functions as a check valve and will expand radially outwardly to permit the escape of fluid radially outwardly through the passages when fluid at the outlet 86 is at a pressure greater than the fluid at the inlet 84.

It will be seen that the valve seat member 96 is provided with an axially extending lip 124 at its right-hand end and adjacent its inner periphery. This lip is suitably slotted to provide for the flow of fluid radially therepast. However, it is under slight compression in order to maintain the valve seat member 96 seated against the housing shoulder 94. In addition, the outer peripheral surface 98 and an end wall 126 of the valve seat member 96 are provided with a plurality of angularly or circumferentially spaced grooves 130 of a shape similar to the grooves 56 of the embodiment of the invention illustrated in FIG. 1. The grooves 130 extend axially along the entire length of the valve seat member 96 and radially inwardly adjacent the end wall 126. The grooves 130 are open to the end wall 110 of the valve seat member 96 and are able to receive and displace fluid from and to the rear brake cylinders 24 in a manner similar to the grooves 56 of the embodiment of the invention illustrated in FIG. 1.

During light braking, the device of FIG. 3 produces no modification of the rear brake pressure with respect to the front brake pressure. This is because the device of the present invention provides open communication between the inlet 84 and the outlet 86 along a path extending from the inlet opening 84 to the space immediately adjacent the inner periphery 100 of the valve seat member 96, through the slots in the lip 124, through the space between the valve seat member end wall 110 and the valve shoulder 106, through a plurality of axially extending angularly spaced grooves 132 formed in the outer periphery of the flange 108, and through radially extending grooves 134 formed in the end wall of the flange 108. The grooves 134 are open to the bore 117 which is, in turn, in communication with the outlet opening 86. The fluid pressurized by the master cylinder within the bores 90 and 92 acts against the body member 102 over an effective area equal to the diameter of the piston head 104 and the diameter of the bore 92. This produces a force on the body member 102 tending to move the body member to the left against the force of spring 114. When this force exceeds the force of the spring 114, the spring 114 will yield permitting the annular valve shoulder 106 to contact the end wall 110 of the valve seat member 96 and block communication between the inlet opening 84 and the outlet opening 86. Further increases in master cylinder pressure will act against the inner peripheral surface 100 of the valve seat member 96 causing the valve seat member 96 to compress radially outwardly against the wall of the bore 90 and displace fluid out of the grooves 130 to the rear brake cylinders 24. Thus, some increase in rear brake pressure after closure of the valve shoulder 106 is produced by the valve seat member 96. However, when the grooves 130 are substantially collapsed, further increases in master cylinder pressure will cause a reopening of the valve shoulder 106. This is because the increased master cylinder pressure will act against flange 108 over an effective area equal to the difference between the diameter of the piston head 104 and the mean sealing diameter of the valve shoulder 106 with the valve seat end wall 110. This produces a force assisting the spring 114 in opposing the force produced by rear brake pressure acting against an area having a diameter equal to the mean sealing area of the valve shoulder 106. Accordingly, the rear brake pressure will be permitted to increase by the alternate opening and closing of the valve shoulder 106. However, the increase in rear brake pressure will be at a lesser rate than the increase in master cylinder or front brake pressure. This results from the fact that the area of the body member 102 against which rear brake pressure acts is greater than the aforementioned effective area of the body member against which front brake pressure acts and a lesser increase in rear brake pressure is required to balance a given increase in front brake pressure. Accordingly, the ratio of front brake pressure to rear brake pressure will go up as master cylinder pressure is increased.

Assuming that the rear brakes have been pressurized in a manner modulated as described above, a reduction in master cylinder pressure will permit the rear brake pressure to fall at the same rate at which it was increased. The first reduction in master cylinder pressure will create a force imbalance causing the body member 102 to move to the left and causing the shoulder 106 to embed into the material of the valve seat member 96. Also, the reduction in master cylinder pressure acting against the inner peripheral surface 100 of the valve seat member 96 will enable the valve seat member 96 to expand radially inwardly. The volume of the grooves 130 is increased to permit fluid to flow into the grooves 130 thereby helping to relieve the pressure of the rear brake cylinders. The embedment of the annular valve shoulder 106 into the axially elongated valve seat member 96 and the expansion of the grooves 130 combine to provide sufficient relief for rear brake pressure to permit this pressure to descend at a rate similar to that at which it was increased. It will be noted that the rear brake cylinder pressure can never be greater than the master cylinder pressure inasmuch as the check valve sleeve 122 will permit the direct escape of fluid from the outlet opening 86 to the inlet opening 84 through the passages 120 if the master cylinder pressure should ever be reduced below the level of the rear brake cylinder pressure.

FIGURE 4 illustrates still another form of the present invention incorporated within a housing 140. The housing 140 is formed with an inlet 142 adapted to be connected to the conduit 14 and thus to the master cylinder 10 and front brake cylinders 18. The housing 140 is also fitted with a closure plug at its right-hand end provided with an outlet opening 146 adapted to be connected to the rear brake cylinders 24. The housing has a chamber 148 operable to provide communication between the inlet opening 142 and the outlet opening 146. The chamber 148 opens directly into a bore 150 which, in the illustrated embodiment, is located to the left of the inlet opening 142. A body member 152 is positioned within the chamber 148 and is provided with an integral piston head 154 slidably and sealingly disposed within the bore 150. The piston head 154 is located at the left-hand end of the body member 152, while a valve element 156 having the shape of a generally radial flange is formed at the right-hand end of the body member 152. The valve element 156 is operable to make sealing contact with an annular resilient valve seat 159 which sealingly contacts the wall of the chamber 148 and is held against an annularly extending radial shoulder of the housing 160 by means of the closure plug 144.

The body member 152 carries an elastomeric check valve 162 which has a generally sleeve-shaped configuration. The check valve 162 is seated within an annular groove 164 of the body member 152 and is provided with a reduced thickness annular lip 166 at its left-hand end which normally engages an annular surface 168 of the body member 152 to prevent the flow of fluid to the space between the body member 152 and the valve 162 from the inlet opening 142. The valve member 162 also has a plurality of axially extending circumferentially spaced grooves 170 disposed on its inner periphery which lie adjacent a radially outwardly facing annular surface 172 of the body member 152. The surface 172 is provided with an annular groove or recess 174 at its right-hand end which provides communication between the grooves 170 and a plurality of radially extending passages 176 extending inwardly to a recess 178 formed at the right-hand end of the body member 152 and open to the outlet opening 146. Accordingly, a return flow path for brake fluid is provided from the outlet opening 146 to the inlet opening 142 through the recess 178, the radial passages 176 and the grooves 170. Should fluid within the grooves 170 be at a higher pressure than fluid at the outside of the lip 166, the lip 166 will be distorted radially outwardly to permit fluid to flow between the lip 166 and the valve element 156 and thence to the inlet opening 142. Another path for the flow of fluid between the inlet opening 142 and the outlet opening 146 is provided through the annular space between the check valve 162 and the valve seat member 159, around the valve element 156 and radially inwardly through a plurality of radial grooves 180 formed in the right-hand end of the body member 152 and communicating with the recess 178.

The body member 152 is normally biased against an annular wall 182 of the closure plug 144 by means of a pair of coil springs 184 and 186 disposed within a recess 188 at the left-hand end of the housing 140. The springs 184 and 186 are seated against a flat metal plate 190 which is held in place within the recess 188 by means of a split retainer ring 192. The springs 184 and 186 bear against a retainer 194 disposed in abutment with a washer 196 which, in turn, bears against an annular shoulder 198 adjacent the left-hand end of the piston head 154. The springs 184 and 186 serve to maintain the body member 152 in the position shown in the drawing when the brakes are not applied or when the brakes are applied lightly.

When the pressure delivered to the inlet opening 142 from the master cylinder attains a selected magnitude at which it is desired to begin compensation for weight transfer, the pressure, acting against the right-hand end of the body member 152 over an effective area having the diameter of the piston head 154, will produce a force sufficient to overcome the combined forces of the springs 184 and 186 and cause the member 152 to move to the left until the valve element 156 sealingly engages the valve seat member 159. At this point, further pressurization of fluid at the outlet 146 by direct fluid communication with the inlet 142 will have been interrupted. Any further increase in fluid pressure at the inlet 142 will radially inwardly compress the check valve member 162. This causes collapsing of the grooves 170 to displace fluid from the grooves through the passages 176 to the outlet 146. The grooves 170 have the same cross-sectional shape as the grooves 56 of the first embodiment of the invention and resist distortion with successively greater force. This causes the rear brake pressure to rise at a slower rate than the front brake pressure. Should the grooves 170 afford an insufficient volume of fluid to pressurize the rear brakes as desired, the valve element 156 will open to bleed small amounts of fluid to the rear brakes for this purpose. In this connection, it will be noted that increases in front brake pressure after the initial closure of the valve element 156 will act against the body member 152 over an annular area equal to the difference in diameter between the piston head 154 and the mean diameter of the area of contact of the valve element 156 with the valve seat member 159. This produces a force on the body member 152 assisting the springs 184 and 186 and, if the magnitude of increase in inlet pressure is sufficient the valve element 156 will be reopened by movement of body member 152 to the right. In practice, the valve element 156 will remain closely adjacent to the valve seat member 159, alternately opening and closing to bleed small amounts of fluid from the inlet to the outlet sides of the valve element 156. Rear brake pressure at the outlet 146 will act against the body member 152 in a direction attempting to move the body member 152 to the left. However, it acts against an effective area having a diameter equal to the mean sealing area of the valve element 156. This area is, of course, greater than the effective area against which the opposing pressure at the inlet acts. For this reason a lesser increase in outlet pressure is needed to balance the forces on the piston and outlet pressure or rear brake pressure will rise at a slower rate than inlet or front brake pressure.

When the vehicle operator begins to reduce the force with which the brakes are applied and thereby lowers the fluid pressure at the inlet opening 142, the difference in forces acting on the body member 152 will be such that the body member 152 moves to the left, causing the valve element 156 to dig into the valve seat 159. This, of course, serves to relieve pressure at the outlet opening 146. Further relief of the fluid at the outlet 146 is provided by the check valve 162 inasmuch as it will tend to expand radially outwardly so that the grooves 170 return to their normal shape and receive fluid from the outlet 146. Should the pressure at the outlet 146 ever become greater than the pressure at the inlet 142, the lip 166 of the check valve 162 will be distorted radially outwardly to directly bypass fluid past the check valve from the outlet opening 146 to the inlet opening 142. Normally, however, the embedment of the valve element 156 into the rather axially thick valve seat 159, together with the return of the grooves 170 to their normal shape, will be sufficient to relieve the pressure at the outlet concurrently with a reduction of pressure at the inlet so that outlet pressure will descend at roughly the same rate as it increased.

While it will be apparent that the embodiments of the invention illustrated herein are well calculated to fulfill the objects above stated, the invention is susceptible to modification, variation and change without departing from the fair meaning or scope of the subjoined claims.

What is claimed is:

1. A proportioning valve adapted to be interposed between a fluid motor and a brake cylinder of a vehicular hydraulic brake system including a housing having an inlet opening, an outlet opening and a chamber providing communication between said inlet opening and said outlet opening; a piston in said chamber movable in response to a predetermined pressure differential between said inlet opening and said outlet opening; a valve element carried by said piston operable to block fluid communication between said inlet opening and said outlet opening; and elastomeric valve means exposed to inlet fluid pressure on one side thereof and having recess means on the opposite side thereof exposed to outlet fluid pressure, said valve means being compressible in response to an increase in inlet fluid pressure over outlet fluid pressure after closure of said valve element to contract the volume of said recess means whereby said recess means will expand upon a subsequent reduction in inlet fluid pressure to relieve outlet fluid pressure.

2. A proportioning valve adapted to be interposed between a fluid motor and a brake cylinder of a vehicular hydraulic brake system including a housing having an inlet opening, an outlet opening and a chamber providing communication between said inlet opening and said outlet opening; a piston in said chamber movable in response to a predetermined pressure differential between said inlet opening and said outlet opening; a valve element carried by said piston operable to block fluid communication between said inlet opening and said outlet opening; and elastomeric valve seat means exposed to inlet fluid pressure on one side thereof and having recess means on its opposite side exposed to outlet fluid pressure, said valve seat means being engageable by said valve element and being compressible against a surface of said housing by an increase in inlet fluid pressure over outlet fluid pressure after closure of said valve element to contract the volume of said recess means whereby said recess means will expand upon a subsequent reduction in the fluid pressure to relieve outlet fluid pressure.

3. A proportioning valve adapted to be interposed between a fluid motor and a brake cylinder of a vehicular hydraulic brake system including a housing having an inlet opening, an outlet opening and a chamber providing fluid communication between said inlet opening and said outlet opening; a piston in said chamber movable in response to a predetermined pressure differential between said inlet opening and said outlet opening; a valve element carried by said piston; elastomeric valve seat means engageable by said valve element to block fluid communication between said inlet opening and said outlet opening; a check valve operable to permit the flow of fluid from said outlet opening to said inlet opening when pressure at said outlet opening is greater than pressure at said inlet opening; one of said valve seat and check valve means having a recess on one side thereof in communication with said outlet and being compressible against adjacent structure by an increase in inlet pressure over outlet pressure after closure of said valve for displacing fluid to said outlet opening and receiving fluid from said outlet opening in response to changes in fluid pressure at said inlet opening.

4. A proportioning valve adapted to be interposed between a fluid motor and a brake cylinder in a vehicular hydraulic brake system including a housing having an inlet opening, an outlet opening and a chamber providing communication between said inlet opening and said outlet opening; a body member disposed in said chamber and having a piston portion movable in response to a predetermined pressure differential between said inlet opening and said outlet opening and a valve element portion operable to block fluid communication between said inlet opening and said outlet opening; and elastomeric valve means exposed to inlet fluid pressure on one side thereof and having recess means on the opposite sides thereof exposed to outlet fluid pressure, said valve means being compressible in response to increase in inlet fluid pressure over outlet fluid pressure after closure of said valve to displace fluid from said recess means to said outlet opening and whereby said recess means will receive fluid from said outlet opening upon a subsequent decrease in inlet fluid pressure.

5. A proportioning valve adapted to be interposed between a fluid motor and a brake cylinder in a vehicular hydraulic brake system including a housing having an inlet opening, an outlet opening and a chamber providing communication between said inlet opening and said outlet opening; a piston disposed in said chamber, a spring operable to bias said piston in a given direction, said piston being biased by inlet fluid pressure in a direction opposing said spring; a valve element carried by said piston and closable on said movement of said piston to block fluid communication between said inlet opening and said outlet opening; and elastomeric valve means associated with said piston exposed to inlet fluid pressure on one side thereof and having a plurality of grooves on its opposite side exposed to said outlet opening whereby said grooves will collapse in response to an increase in inlet fluid pressure over outlet fluid pressure after closure of said valve to displace fluid to said outlet opening whereby said grooves will receive fluid from said outlet opening upon a subsequent decrease in inlet fluid pressure.

6. A proportioning valve adapted to be interposed between a fluid motor and a brake cylinder in a vehicular hydraulic brake system including a housing having an inlet opening, an outlet opening, and a chamber provided with an enclosing wall and providing communication between said inlet opening and said outlet opening; a piston disposed in said chamber; a spring operable to bias said piston in a given direction, said piston having an effective area exposed to inlet fluid pressure sufficient to cause piston to move against said spring at a predetermined level of inlet fluid pressure; a valve element carried by said piston; an elastomeric annular valve seat member engageable by said valve member upon movement of said piston against said spring, said valve seat member being engageable with said enclosing wall at its outer periphery and having a plurality of recesses adjacent said enclosing wall exposed to said outlet opening, said valve seat member being exposed to inlet fluid pressure at its inner periphery whereby said valve seat member will compress against said enclosing wall upon an increase in inlet fluid pressure over outlet fluid pressure after closure of said valve; and an axially extending lip on said valve seat member engageable with said enclosing wall and distortable away from said enclosing wall upon a decrease in inlet fluid pressure below outlet fluid pressure to permit the flow of fluid from said outlet opening to said inlet opening through said recess means.

7. A proportioning valve adapted to be interposed between a fluid motor and a brake cylinder in a vehicular hydraulic brake system including a housing having an inlet opening, an outlet opening and a chamber providing communication between said inlet opening and said outlet opening; a piston disposed in said chamber; a spring operable to bias said piston in a given direction, said piston being biased by inlet fluid pressure in a direction opposing said spring; a valve element carried by said piston; valve seat means engageable by said valve element to block communication between said inlet opening and said outlet opening upon movement of said piston in a direction compressing said spring; an annular elastomeric check valve member mounted on said piston, bypass means normally closed by said check valve means, said check valve member having recess means on one side thereof in communication with said outlet opening whereby said check valve member will compress against said piston upon an increase in inlet fluid pressure over outlet fluid pressure after closure of said valve element against said valve seat to displace fluid from said recess means to said outlet opening; and an axially extending lip formed on said check valve member normally sealingly engageable with said piston, said lip being distortable away from said piston to permit the flow of fluid from said outlet to said inlet through said recess means when the pressure at said outlet is greater than the pressure at said inlet.

8. The structure set forth in claim 3 in which said valve seat member possesses a greater axial length than radial wall thickness to permit said piston to move a substantial axial dimension after closure of said valve element by embedment of said valve element in said valve seat member.

9. A proportioning valve adapted to be interposed between a fluid motor and a brake cylinder in a vehicular hydraulic brake system including a housing having an inlet opening, an outlet opening, and a chamber providing communication between said inlet opening and said outlet opening; a body member disposed in said chamber having a piston at one end thereof and a valve head at the other end thereof, a valve seat engageable by said valve head for blocking communication between said inlet opening and said outlet opening; a spring biasing said body member in a direction normally maintaining said valve head out of engagement with said valve seat; said inlet opening being located between said valve head and said spring and said outlet opening being located at the end of said body member adjacent said valve head; said body member extending through said valve seat and being dimensioned with respect to said valve seat to provide an annular space between said valve seat and said body member whereby fluid flows from said inlet through said space and around said valve head to said outlet opening; said body member having an effective area exposed to inlet fluid pressure sufficient to cause said valve head to close against said seat against the force of said spring when the pressure fluid at said inlet opening reaches a predetermined level.

10. The structure set forth in claim 9 in which said valve seat is of substantial axial thickness whereby said body member may move axially while permitting said valve head to maintain sealing engagement with said valve seat.

11. The structure set forth in claim 9 including check valve means operable to permit fluid to flow past said body member upon a condition of higher outlet fluid pressure then inlet fluid pressure, said check valve means being inoperable upon conditions of greater inlet fluid pressure than outlet fluid pressure.

No references cited.

MARTIN P. SCHWADRON, *Primary Examiner.*

R. R. BUNEVICH, *Assistant Examiner.*